United States Patent [19]

Connolly et al.

[11] 4,339,112

[45] Jul. 13, 1982

[54] INTEGRAL END CLOSURE AND HUB FOR VALVE BODY AND METHOD OF FORMING SAME

[75] Inventors: Walter L. Connolly, Moraga; Harold T. Ray, Walnut Creek, both of Calif.

[73] Assignee: Grove Valve and Regulator Company, Oakland, Calif.

[21] Appl. No.: 146,764

[22] Filed: May 5, 1980

[51] Int. Cl.³ .................. F16K 27/00; F16K 5/00
[52] U.S. Cl. .................................................. 251/367
[58] Field of Search .............. 251/366, 367, 309, 315; 29/157.1 R

[56] References Cited

U.S. PATENT DOCUMENTS

| | | | |
|---|---|---|---|
| 3,348,804 | 10/1967 | Piccardo | 251/367 |
| 3,666,237 | 5/1972 | Piccardo | 251/367 |
| 3,737,145 | 6/1973 | Heller et al. | 251/309 |
| 3,869,108 | 3/1975 | Graham | 251/366 |

Primary Examiner—A. Michael Chambers
Attorney, Agent, or Firm—Melvin R. Stidham

[57] ABSTRACT

An integral valve end closure and hub formed from a circular section of steel plate having a small coaxial hole in the center. The steel around the hole is swaged outward with a tapered die for initial forming of a hub and then, in a second swaging operation, the outer portion is swaged to substantially cylindrical configuration. The result is an end closure starting with a cylindrical hub at the pipeline connection, and then flaring outward almost to the inner diameter of the main body member to which the closure is attached, by bolting or welding.

3 Claims, 6 Drawing Figures

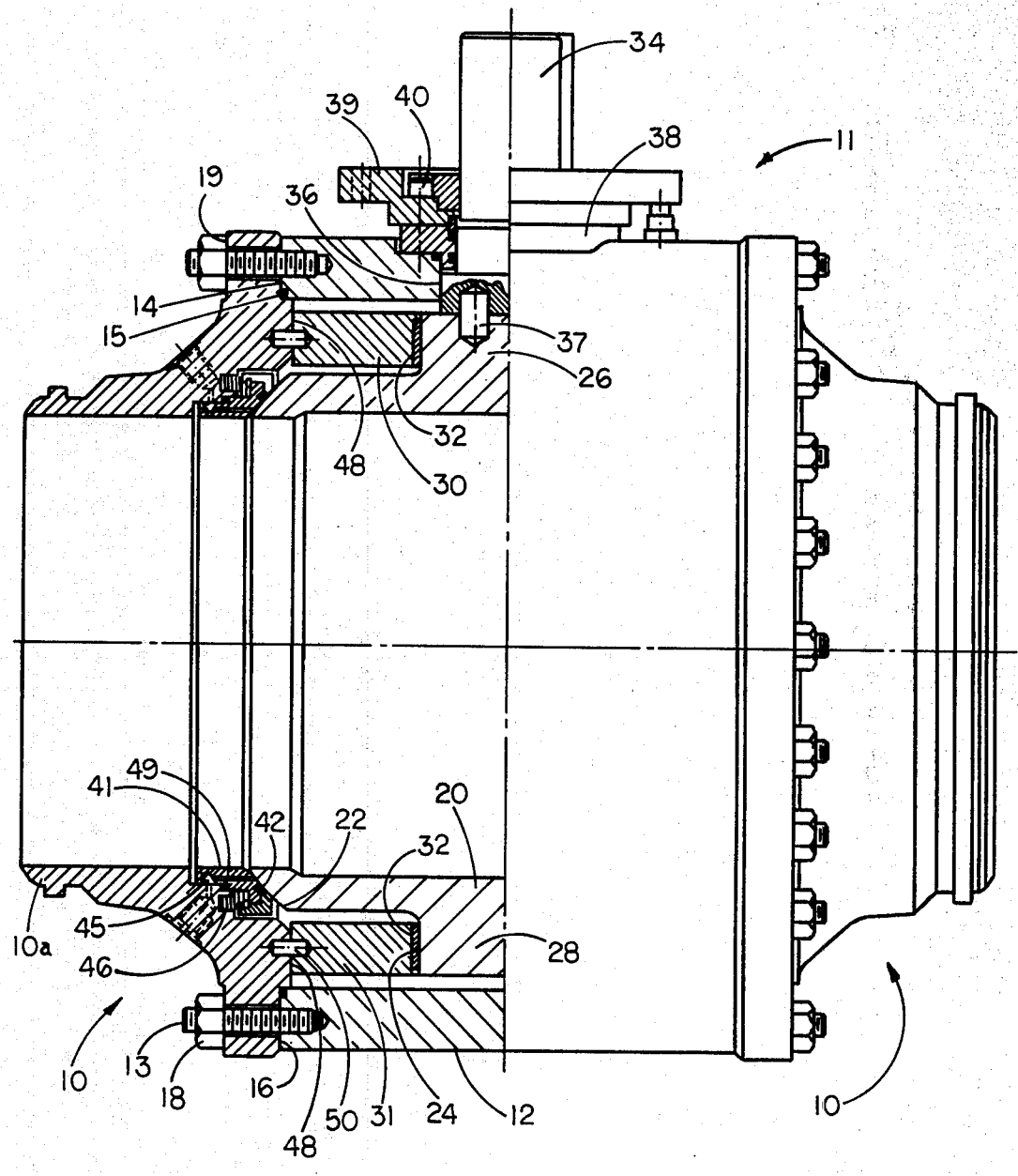
FIG.-1-

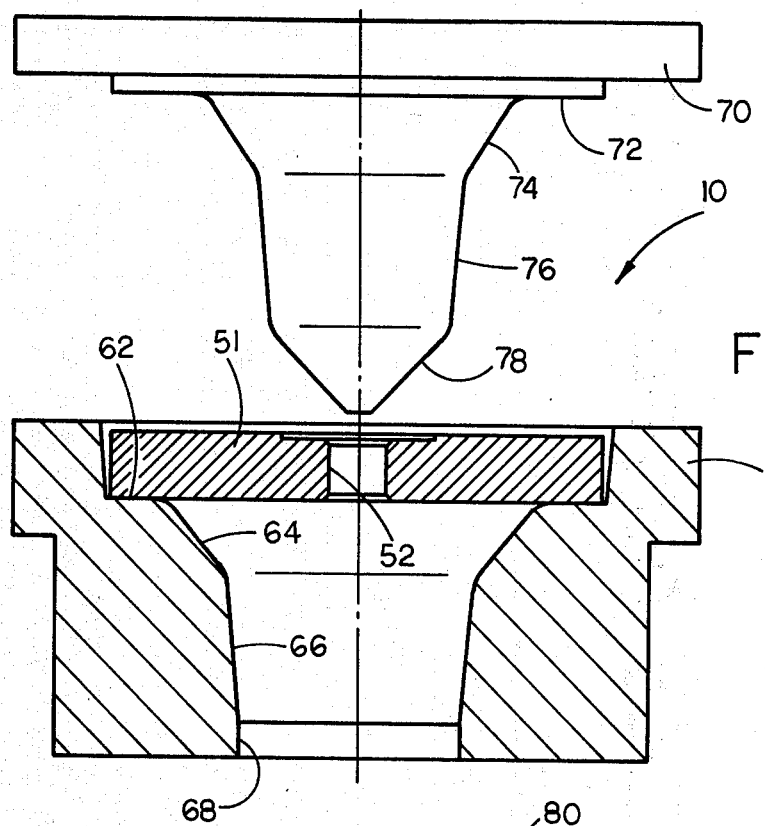
FIG.-2-
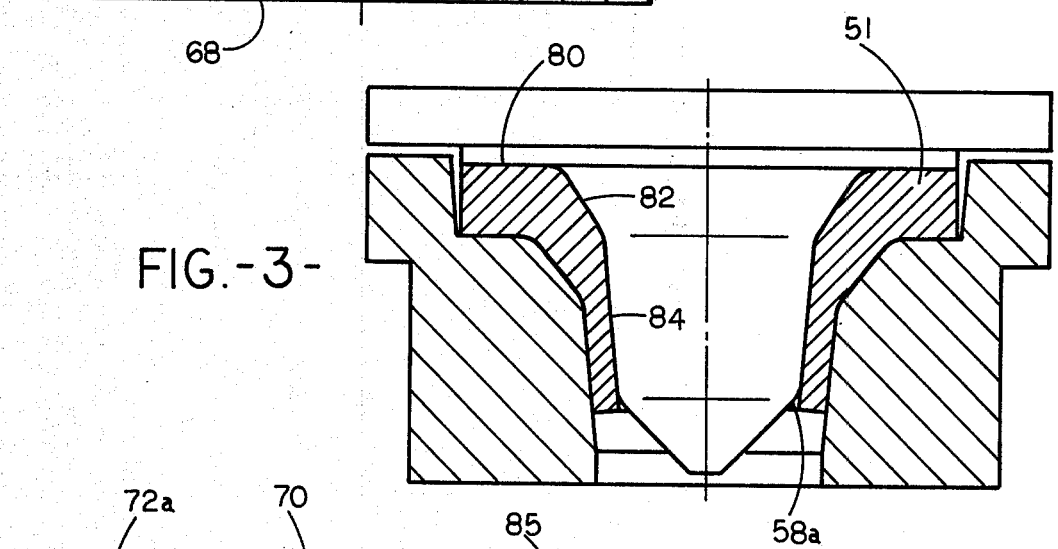
FIG.-3-
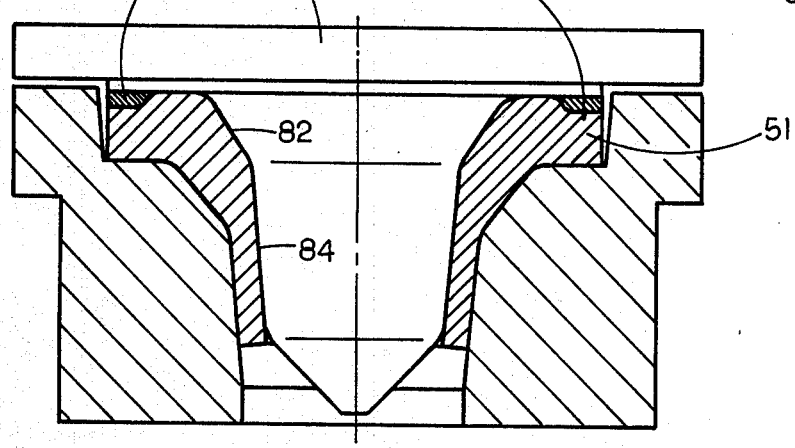
FIG.-4-

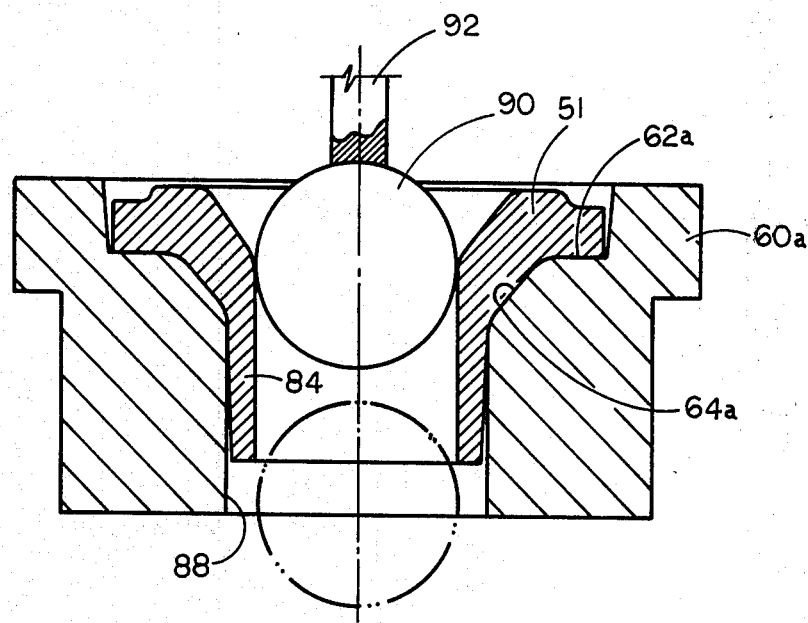
FIG.-5-
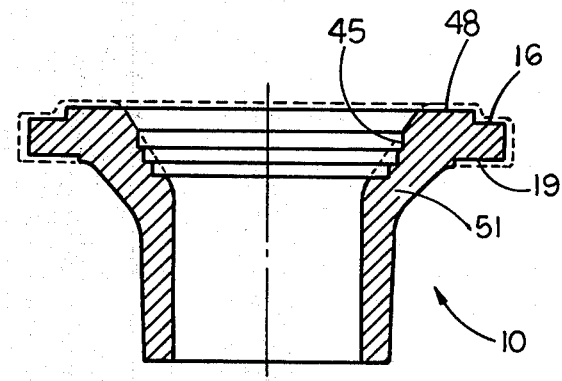
FIG.-6-

4,339,112

INTEGRAL END CLOSURE AND HUB FOR VALVE BODY AND METHOD OF FORMING SAME

BACKGROUND OF THE INVENTION

It has been found highly advantageous, where possible, to form valve bodies and other pressure vessels from rolled steel shapes, wherein the material is generally denser and of greater uniformity than can usually be achieved with metal castings. For example, ball valves, check valves and the like are commonly formed with a main body band of cylindrical or spherical configuration, with at least one full size end opening through which a ball, clapper, plug or other closure member can be inserted. In completing fabrication, this opening is covered with an end closure carrying a hub for attaching the valve member into a pipeline. When forming the end closure of steel plates, it is conventional practice to form it in at least two pieces, one a flat plate with a large central opening which is bolted or otherwise secured to a main body member, and the other a cylindrical pipe which is welded into the opening for installation in a pipeline. Often, recesses are cut into the flat plate to accomodate sealing rings which engage against the valve member to effect a seal. The main body member, then, must be wide enough to cover the valve member and span the space between the two flat inner surfaces of the opposing end closures.

OBJECTS OF THE INVENTION

It is an object of this invention to provide a valve body end closure which uses, without waste, virtually all of the metal of a circular plate section.

It is a further object of this invention to provide a one-piece valve end closure and hub of plate steel which eliminates the extensive welding operation, which is required to secure a cylindrical hub to it.

It is a further object of this invention to provide an integral end closure and hub having structural continuity from outer end closure diameter to the end of the hub.

Other objects and advantages of this invention will become apparent from the description to follow, particularly when read in conjunction with the accompanying drawings.

SUMMARY OF THE INVENTION

In carrying out this invention, I provide a valve end closure, which is formed from a single plate of rolled steel. A circular plate is cut from the rolled steel and a small hole is cut in the center thereof. A tapered die is forced through the hole to swage the metal outward. The die initially has a slight taper and then flares rather sharply to a diameter slightly less than the diameter of the work piece. Then, a second die of the diameter of the pipeline for which the valve is designed, is forced through the opening so that the tapered hub terminates in a generally cylindrical outer portion. The result is an integral end closure and hub, which eliminates an extensive welding operation and which results in substantial saving of material, as will hereinafter be described.

BRIEF DESCRIPTION OF THE DRAWINGS

In the drawings

FIG. 1 is a elevation view, half in section, of a ball valve embodying features of this invention;

FIGS. 2, 3 and 4 are more or less schematic views in section showing three stages of an initial swaging operation;

FIG. 5 is a schematic view in section showing a subsequent swaging operation;

FIG. 6 is a schematic section view, illustrating the removal of material in subsequent machining operations to complete the end closure.

DESCRIPTION OF A PREFERRED EMBODIMENT

Referring now to FIG. 1 with greater particularity, the end closures 10 of this invention, have integral hubs 10a with their ends adapted for installation in a pipeline, as by machining them for welding. The integral structures are shown as principal components of a ball valve 11 of a type which is widely sold for pipeline installations. The ball valve 11 may include a main body band 12 which may be of cylindrical configuration formed by rolling up a steel plate, and the end closures are secured directly to the body band by means of a plurality of studs 13, which are threaded into the tapped openings around the annular end 14 of the body. A seal ring 15 around the annular and 14 renders the structure 12 fluid tight. The end closures 10 are then placed over the studs 13 with a flange surface 16 thereon engaging the annular body band end surfaces. Then nuts 18 are tightened against the outer flange surface 19 to secure the end closures 10 in place.

In practice, one end closure 10 with seat ring assembly 41 therein, is secured to the body band 12 as just described, and then a valve ball 20 which may be cast and then machined at 22 to form a smooth, highly polished spherical outer surface and at 24, to finish upper and lower journals 26 and 28, which are formed integral with the ball 20. Then, top and bottom bearing blocks 30 and 31, each with suitable bushings 32, are placed over the journals 26 and 28 and the entire assembly is inserted into an open end of the body band 12.

A stem 34 is inserted through a top opening 36 in the body band, is coupled to the upper trunion 26 by means of pins 37. Finally, a gland plate 38 with suitable sealing means to seal around it, as well as around the stem 34, together with a valve operator mounting plate 39, are secured in place, as by means of cap screws 40.

In completing the fabricating operation, the seat rings 41 with suitable seal rings 42 and 49 for sealing against the valve ball 20 and the end closure 10, respectively, are inserted in place in recesses 45 in the end closure, against biasing springs 46. Then the end closure is mounted on the main body band and bolted to the annular end thereof, as previously described. When so secured an extended face 48 on the end closure, clamps firmly against the bearing blocks 30 and 31, which are positioned relative thereto by pins 50.

The Formation of the End Closures

Referring now to FIGS. 2 to 4 the end closure 10 is formed by cutting a circular work-piece 51 of rolled steel plate through which a small coaxial, circular opening 52 is out. The work piece 51 is placed in a female die 60 having a generally planar outer support surface 62, which merges into a sharply flared upper conical surface 64, and then into slightly tapered lower surface 66. Cooperating with the female die is a male die 70 having male surfaces 72, 74 and 76, which are complementary to the inner surfaces 62, 64 and 66 of the female die, and a sharply tapered end portion 78.

In formation, the work-piece 51 is heated to glowing and placed in the die 60. The press 70 is driven down to swage the steel around the small center opening 52 to a configuration following the contours of the dies 60 and 70. Specifically, the work-piece 51 which will ultimately become an end closure 10 retains a flat, planar outer portion 80 for attachment to the body band 12 and then tapers sharply into a small diameter and then more gradually at 84 to a diameter slightly less then the ultimate pipeline diameter.

Since, as shown in FIG. 1, that annular portion 48 of the end closure 10, 55 clamps and secures the bearing blocks 30 and 32 is somewhat thicker, some machining can be saved, and the strength in the area of the bolting circle enhanced, by compressing the outer annular portion of the work-piece 51 by forging with an annular die 72a. This both reduces the thickness, and improves the grain flow lines of the outer portions 85.

Referring now to FIG. 5, the final swaging operation is done in a second female die 60a again having a flat, planar outer support surface 62a and a rather sharply tapered outer portion 64a. However, this sharply tapered portion 64a merges directly into a substantially cylindrical opening 88 adapted to accomodate a male die of circular cross section. For example, a sphere 90 of a diameter substantially equal to the desired inner hub diameter may be forced through the work-piece 51 to dilate the previously tapered outer portion of the work-piece into the cylindrical configuration shown.

Finally, as shown in FIG. 6, the work-piece 50 undergoes machining operations for removal of material, as indicated by dotted lines, to form the bolting flange surface 16 and 18, the bearing block clamping surfaces 48, and the seat ring recesses 45.

It will be noted that, in forming an end closure 10 in accordance with this invention, a much smaller hole 52, than was previously required is cut through the work-piece 50. This reduces cutting time and it saves a quantity of steel that was often wasted previously. The method also eliminates the need to form a separate cylindrical hub which, when formed by rolling a flat plate required a welding operation to form a seam between the ends, which were rolled together. Further, the method eliminates the need to machine both the flat plate and the cylindrical hub to prepare them for welding, and it eliminates the welding operation itself, not to mention the extensive weld tests and inspections that are required for safety and environmental purposes. After preparing the work-piece, the end closure with integral hub is formed for finish machining by two successive swaging operations.

The hub so formed has the strength and simplicity of an integral structure, and being formed from rolled steel plate it has a fiber structure, common to rolled steel flowing in continuity from the outer periphery of the end closure 10, along the hub portion 84 to the pipeline connection end 10a.

The funnel shape of the end closure may provide greater strength and, by cutting seat ring recesses 45 in the tapered portion 82, they are displaced from the planar outer surfaces 16 and 48. This enables use of a narrower body band 12, effecting a further saving in metal.

While this invention has been described in conjunction with a preferred embodiment thereof, it is obvious that modifications and changes therein may be made by those skilled in the art without departing from the spirit and scope of this invention, as defined by the claims appended hereto.

What is claimed as invention is:

1. For a ball valve body having a generally cylindrical tubular main body band with an annular end surface and a valve ball journalled therein, the width of said body band being less that the diameter of said ball;

means forming a generally circular, end closure for said body band from a single thick flat steel plate;

said means further forming an integral tubular hub on said end closure;

a circular flow passageway through said integral end closure and hub;

the steel of said end closure being swaged axially outward around said flow passageway to form said hub with an inner surface of pipeline diameter at the axially outer end thereof flaring radially outward to extend closely adjacent the surface of said valve ball to merge with generally radially portions of said end closure extending in the outer diameter thereof;

an annular recess for a seal ring assembly out in said outwardly flaring portion axially outward of said radial portions; and means attaching said end closure to said annular end surface of the body band.

2. The integral end closure, and hub defined by claim 1 wherein:

the steel of said hub is swaged outward to form a tapered inner surface from near the periphery of said end closure, terminating in a generally cylindrical configuration.

3. The integral end closure and hub defined by claim 1 wherein:

the steel of said end closure and hub is swaged outward to form a generally conical inner surface from near the periphery of said end closure, merging into a generally cylindrical inner surface at the outer end of said hub.

* * * * *